Nov. 15, 1966   P. FAHLENBERG ETAL   3,285,152
PHOTOGRAPHIC SHUTTER
Filed July 9, 1964   3 Sheets-Sheet 3
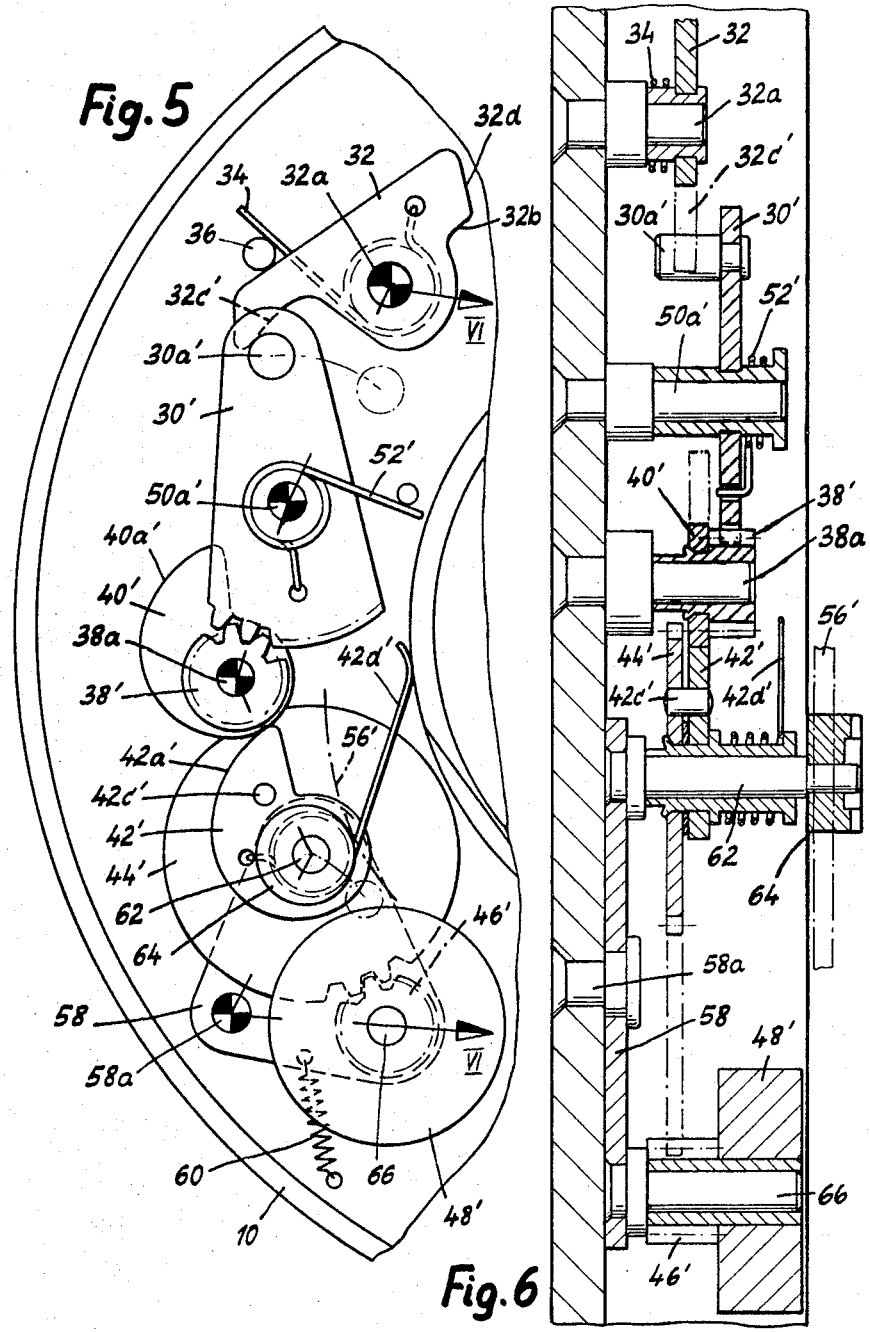

United States Patent Office 3,285,152
Patented Nov. 15, 1966

3,285,152
PHOTOGRAPHIC SHUTTER
Paul Fahlenberg, Baierbrunn, near Munich, and Rudolf Lang, Nettelkofen, near Grafing, Germany, assignors to Compur-Werk Gesellschaft mit beschrankter Haftung & Co., Munich, Germany, a German firm
Filed July 9, 1964, Ser. No. 381,383
Claims priority, application Germany, July 19, 1963, C 30,483
3 Claims. (Cl. 95—63)

This invention relates to a photographic shutter, and more particularly to the delaying or retarding mechanism which controls the running down movement of the shutter, so as to determine the length or duration of the exposure, commonly called the shutter speed.

An object of the invention is the provision of a generally improved and more satisfactory photographic shutter.

Another object is the provision of improved and more satisfactory delaying or retarding mechanism, applicable to shutters of various different kinds or styles.

Still another object is the provision of shutter retarding or delaying mechanism capable of operating over a wide range of variations in a smooth or continuous manner without steps or abrupt breaks in the adjustment range.

A further object is the provision of such a shutter, so designed that it requires very little power to adjust it from one degree of delay or retardation to another, so that the retarding mechanism is suitable for use in a camera controlled, for example, by the rather limited power of a photocell or photoelectric exposure meter.

These and other desirable objects may be attained in the manner disclosed as an embodiment of the invention in the following description and in the accompanying drawings forming a part hereof, in which:

FIG. 3 is a view similar to a part of FIG. 1, with the parts in a different position;

FIG. 5 is a fragmentary view similar to FIG. 1 showing an alternative embodiment of the invention; and FIG. 6 is a cross section taken approximately on the line VI—VI of FIG. 5.

Figure 1:
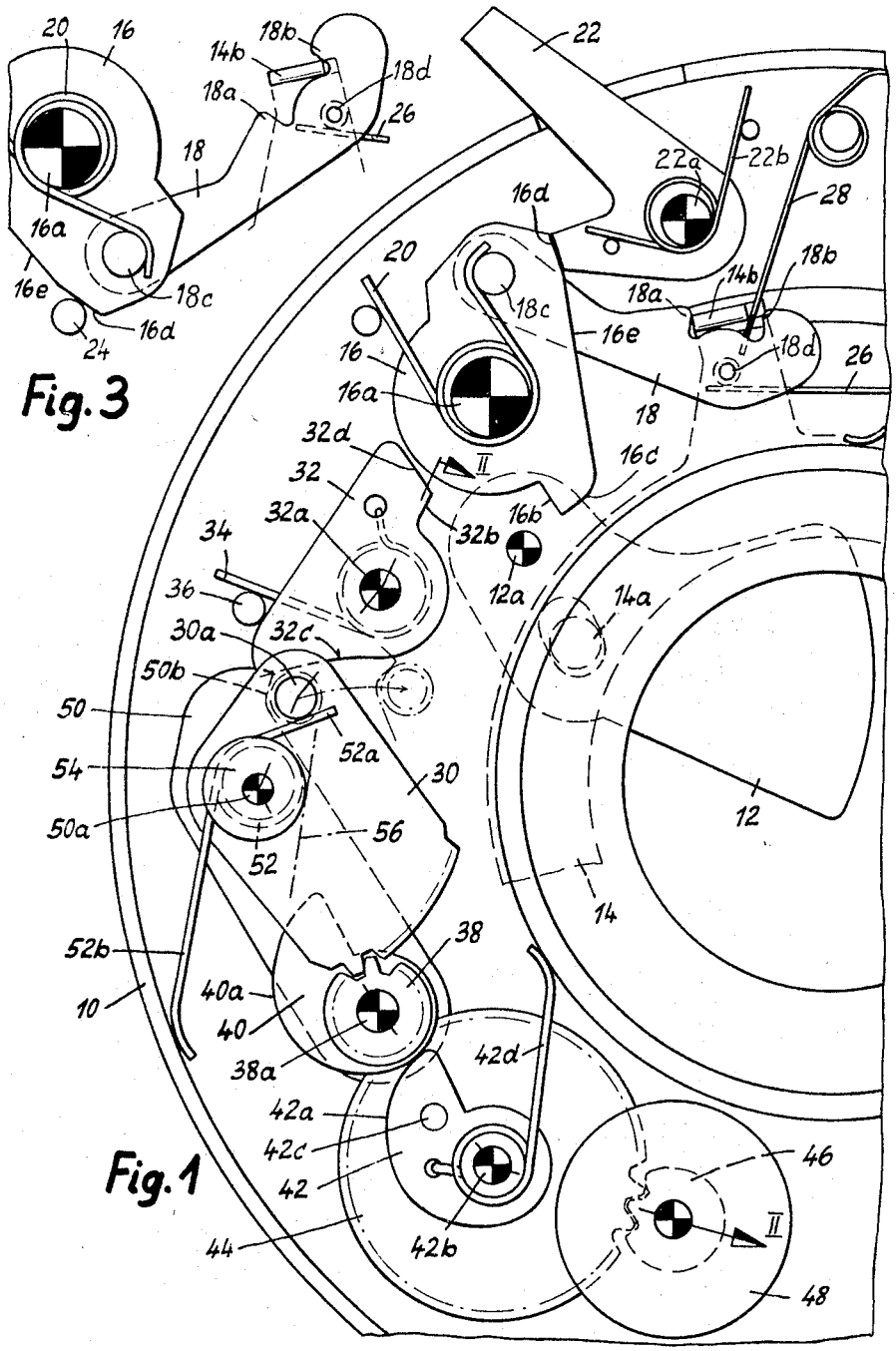
FIG. 1 is a fragmentary front face view or plan of a shutter according to one embodiment of the present invention, with the cover plate and various other parts removed.
Figure 2:
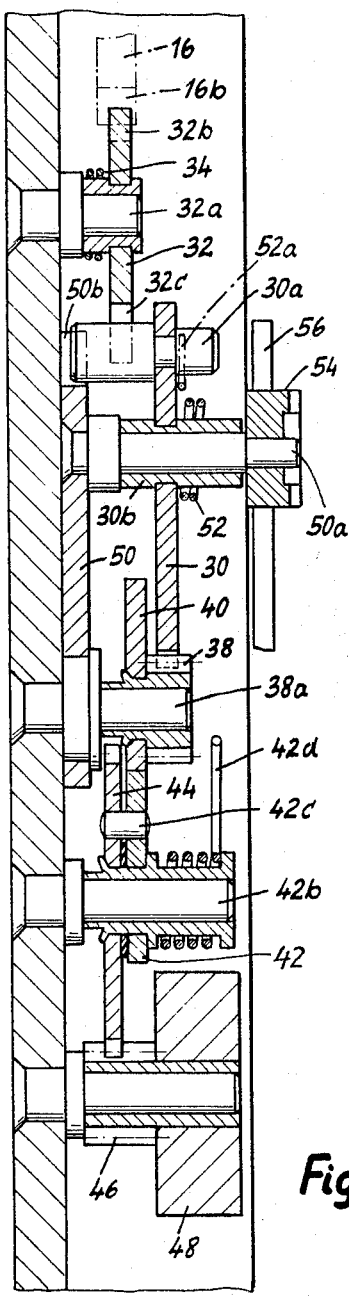
FIG. 2 is a cross section taken substantially on the line II—II of FIG. 1.

The retarding mechanism (often called delaying mechanism) according to the present invention is applicable to various kinds or styles of shutters, including focal plane shutters as well as objective shutters. In any style of shutter, the features other than the features of the retarding mechanism as herein disclosed, may be of conventional form, the details of which are not important for purposes of the present invention. Merely as an illustrative example of the invention, the retarding mechanism is here shown as applied to an objective shutter, sometimes called a between-the-lens shutter or a central shutter.

Referring to the drawings, there is shown a shutter housing or casing indicated in general at 10, of the usual annular form customarily used in objective shutters. It has any desired number of usual shutter blades 12, conveniently five blades, only one of which is illustrated for the sake of clarity of the drawings. Each shutter blade is mounted at 12a on a pivot in the shutter housing, and is operated by means of a driving pin 14a engaging in the usual operating slot in the blade 12, the pin being fixed to a blade ring 14 which is rotatable about the optical axis at the center of the shutter. There is, of course, a separate pin 12a and separate pin 14a for each of the shutter blades 12. When the blade ring 14 is turned in a clockwise direction from the position shown in FIG. 1, the shutter blades 12 are swung on their pivots 12a to an open position, from the closed position shown in FIG. 1. Then when the blade ring turns back in a counterclockwise direction, to the initial position shown in FIG. 1, the blades are closed, the various blades overlapping with each other at their edges so as to completely close and block passage of light through the central light aperture in the shutter.

The blade ring has a radially outwardly extending arm terminal in an upstanding lug 14b by means of which the rotary motion is imparted to the blade ring for opening and closing the blades. The main driving member, commonly called the master member of the shutter, is shown at 16 and is mounted on the shaft 16a in the casing, and is powered by a main spring or master spring 20 which tends constantly to turn the master member in a clockwise direction. A driving link 18 is pivotally connected at its left end when viewed as in FIG. 1, to the master member by means of a crank pin 18c. Near its right end the link has a notch for engaging the ear 14b on the blade ring 14, one end of the notch constituting in abutment 18a and the other end constituting an abutment 18b.

Preferably the master member 16 is fixed to the shaft 16a, which constitutes a tensioning or cocking shaft extending out through the rear wall of the shutter housing, where it is engaged by suitable mechanism of known form which, in well known manner, turns the shaft 16a in a counterclockwise direction so as to tension the master member 16 and wind up the master spring 20, preferably simultaneously with operation of the film transport mechanism. The master member is held in its tensioned or cocked position by a trigger or latch 22 which engages the abutment portion or shoulder 16d of the master member, to hold it against movement in a clockwise direction. When the trigger or latch 22 is moved clockwise on its pivot 22a, against the force of its spring 22b, the master member is released so that the spring 20 drives it in a clockwise direction, thereby causing the link 18 to move rightwardly so that the first abutment 18a thereon engages the edge of the ear 14b and swings the blade ring 14 in a clockwise direction against the force of the light restoring spring 28, thereby opening the shutter blades 12. As the motion of the master member continues in a clockwise direction, the link 18 reaches its dead center position, as far to the right as it can go, and then the crank pin on the master member swings further around and draws the link 18 leftwardly again, so that the other abutment 18b on the link 18 engages the far edge of the ear 14b, pulling the ear back leftwardly, assisted somewhat by the spring 28, thus swinging the blade ring 14 leftward or counterclockwise and closing the shutter blades. A spring 26 engaging a pin 18d depending downwardly from the link 18 meanwhile tends to hold the link in engagement with the ear 14b on the blade ring during these movements of the link. Finally, when the master member has run down completely and reaches its rest position, the master member and link 18 are in the relative positions shown in FIG. 3, and the master member comes to rest with its abutment portion 16d engaged with the fixed abutment pin 24. The extent of running down movement of the master member 16 from its cocked or tensioned position shown in FIG. 1, to the run down position shown in FIG. 3, represents an angular travel of about 150 degrees.

As well understood by those skilled in the art, when a connecting link 18 of this type is used, the master member 16 may be tensioned or cocked in a counterclockwise direction, from the position shown in FIG. 3 back to the position shown in FIG. 1, without causing any movement of the blade ring 14, so the shutter blades 12 will remain in fully closed position while the master member is being tensioned. When the master member is being tensioned, for example by turning the shaft 16a through mechanism connected to the film winding or film transport parts of the camera, the link 18 first moves rightwardly from the position shown in FIG. 3, but it approaches the lug or ear 14b at such an angle that the abutment 18a does not engage the edge of the lug 14b, but rather comes up obliquely against the flat side of the lug and slides along the lug without moving it. Then as the link 18 reaches its extreme rightward position or dead center position and the master member continues to turn counterclockwise, the link is drawn leftwardly again, still without causing any movement of the blade ring 14, and just as the master member reaches its fully tensioned position and becomes latched by the latch 22, the abutment shoulder 18a on the link 18 snaps past the left edge of the ear 14b under the influence of the spring 26, putting the parts in the initial starting position shown in FIG. 1, ready for the next exposure as soon as the latch 22 is released or tripped.

The parts thus far described are well known in the art, and can be varied widely without departing from the present invention, as the present invention is not dependent upon any particular form of master member or main driving member, or any particular form of driving mechanism whereby the shutter blades or other light obstructing parts are moved from the motion of the main driving member or master member. These parts as described above are disclosed merely as an operative example of a shutter of a kind to which the present invention can be applied.

The present invention relates particularly to the retarding mechanism or delaying mechanism which retards or slows down the running down movement of the master member 16 from its tensioned position of FIG. 1 to its run down or rest position of FIG. 3, so as to obtain a longer or slower speed exposure. Of course when an exposure of shortest possible duration or maximum speed is desired, there should be no retarding of the running down motion of the master member. But when a longer or slower speed exposure is wanted, the master member should be retarded to a variable extent, depending upon the desired speed of exposure. Many kinds of retarding mechanism are already known in the art. Some of them require comparatively little power for operation, but have only a relatively narrow range between maximum and minimum retarding effect. Others have a wide range between maximum and minimum, but suffer either from the defect of requiring comparatively large power to adjust them, or from the defect of being adjustable to different speeds in a stepwise or discontinuous manner rather than in a continuous smooth manner. The present invention, a preferred example of which will now be described, overcomes all of these defects and enables regulation of the exposure time or speed with very slight input of power and throughout a wide range in a smooth continuous manner without steps or abrupt changes.

According to the invention, there is a lever 32 which may be called a double-armed transmission lever, pivotally mounted on the fixed pivot 32a and operatively introduced between the master member 16 and the first member 30 of the retarding mechanism. This lever 32 is pressed by a weak spring 34 tending to turn it in a clockwise direction to hold it against a fixed stop pin 36 which limits its motion in this direction. One arm of the lever has a strking face or abutment face 32b which cooperates with the striking shoulder or impact surface 16b on the master member. Near the other end of the lever 32 is another striking surface 32c which cooperates with an operating pin 30a of the first member 30 of the retarding mechanism or retarding train.

This first member 30 of the retarding train mechanism is in the form of a toothed segment fixed to a boss or hub 30b which is mounted for oscillation on a pivot pin 50a which is firmly mounted on a setting plate 50. The gear teeth of the segment member 30 mesh with gear teeth on a pinion 38 which constitutes the next adjacent member of the delaying or retarding gear train, and which is mounted for rotation on a fixed pin 38a. The pinion 38 is, in turn, firmly connected to a cam plate 40, the peripheral cam surface 40a of which bears against the peripheral cam surface 42a of a further cam plate 42 which is mounted for rotation on a fixed pin 42b in the housing. The cam 42 is rigidly connected by means of a pin 42c with a further wheel 44 of the retarding mechanism, which wheel 44 has peripheral gear teeth meshing with the teeth of a pinion 46 connected to a flywheel 48 of relatively large mass, rotated on a fixed pivot. A spring 42d urges the cam plate 42 and its connected gear wheel 44 in a counterclockwise direction, thereby holding the cam 42a in engagement with the cam plate 40.

The above mentioned setting plate 50, which carries the pivot pin 50a on which the segment 30 is rotatable, is mounted for pivotal rotation on the mounting pin 38a of the gear 38. A spring 52 is wound around the boss or hub 30b, and one end 52a of the spring engages the operating pin 30a on the plate 30, while the other end 52b of the spring engages a stationary part of the shutter housing 10. Thus the spring 52 holds the operating pin 30a in engagement with a projection 50b on the setting plate 50, and on the other hand holds the eccentric 54, which is a push fit on the pivot pin 50a, in contact with the operating surface 56 of the usual conventional exposured time or speed setting ring (not completely shown) which, as usual, is rotatably mounted at the front of the shutter for rotation about the central optical axis as a center. When the speed setting ring is turned, the cam surface 56 thereof, operating against the eccentric member 54, pushes the pin 50a farther from the center of the shutter against the force of the spring 52, or relieves the pressure on the eccentric 54 so that the spring 52 may move the pin 50a closer to the center of the shutter, as the case may be, in either case swinging the member 50 on its pivot 38a.

When the pin 50a is moved closer to or farther away from the center of the shutter, by movemetn of the shutter speed control cam 56, this causes similar bodily movement of the gear segment 30 which is mounted on the pivot 50a, and in consequence the segment 30 assumes its desired starting position, closer to or farther away from the abutment surface 32c of the transmission lever 32. FIG. 1 illustrates, in full lines, a typical starting position of the parts for a relatively slow exposure with a relatively long delaying or retarding effect, and it will be seen that the pin 30a is relatively close to if not in actual contact with the abutment surface 32c of the transmission lever 32. FIG. 1 also illustrates in dot dash lines the position of the pin 30a and the associated part 50b when the mechanism is set for a relatively fast exposure with relatively short delay, and it will be seen that in this position the pin 30a has been moved closer to the center of the shutter, so that it is farther away from the abutment surface 32c of the lever 32, and this lever 32 can swing to a considerable extent before it engages and is retarded by the pin 30a. Moreover, in the short delay position, the starting position of the pin 30a is closer to the pin 32a, so that the effective lever arm of the member 32 acting on the pin 30a becomes shorter while the lever arm through which power is applied from the master member remains about the same. Thus when the parts are set for a faster exposure, there is a greater or more powerful leverage effect between the master member 16 and the retarding train member 30 at the instant of contact with the member 30, in addition to the factor that the instant of contact comes at a later stage in the running down cycle of the master member.

Figure 4:
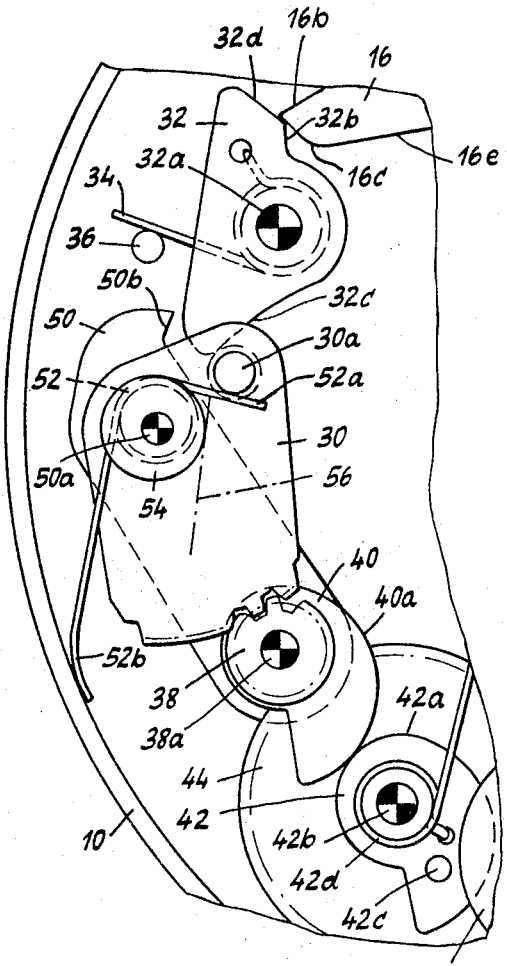
FIG. 4 is a view similar to a portion of FIG. 1, showing some of the parts in still another different position.

During the previously described movement of the toothed segment 30 and its operating pin 30a about the pin 38a, for the purpose of regulating the starting point of the delaying or retarding action, the members 38, 40, 42, 44, 46, and 48 of the delay mechanism which are coupled to the segment 30 are also turned to some extent. The main turning movement of these parts occurs during the running down movement of the shutter, however, rather than during the adjusting or setting operation. FIG. 1 illustrates the starting positions of these parts when set for a relatively long delay or slow exposure speed. FIG. 4 shows the position of the parts approximately at the end of the running down movement.

The pitch of the cam edge 40a on the cam 40 is preferably the same as the pitch of the cam edge 42a on the cam 42, and both cam edges have a continuous and complementary increase or decrease, as the case may be, throughout their effective surfaces which engage each other during the setting and running down movements of the retarding mechanism. With this arrangement, when force is applied to the rotary members 38, 40 to tend to turn them in a counterclockwise direction, there is a continuous variation in the transmission ratio between the part 40 on the one hand and the part 42 on the other hand, which tends to turn the part 42 (and with it, the gear 44) in a clockwise direction against the force of the spring 42d. Thus, at the starting position shown in FIG. 1, for example, there is a transmission ratio of about 1 to 3 between the first member 30 of the retarding train and the last member 48 thereof, while in the position shown in FIG. 4 the transmission ratio has increased to about 3 to 1. The retarding mechanism thus starts its motion with a relatively small transmission ratio which continuously increases during the running down of the parts. Thus in the long or slow exposure condition as illustrated in full lines in FIG. 1, the retarding mechanism will be brought into operation after a very small angular motion of the transmission lever 32, but having regard to the relatively small ratio between the member 40 and the member 42, the flywheel mass 48 moves only with a relatively small angular speed which, however, increases later as the retarding mechanism runs down. The delaying action is thus very considerable, at the beginning. In the case of shorter exposure times, however, the transmission lever 32 does not reach the pin 30a and begin to move the gear train until later and at a point where there is a small transmission ratio between the member 40 and the member 42, with the result that the delaying action is correspondingly shorter and smaller.

As a consequence of the rolling of the cam plate 40 on the cam plate 42, the flywheel mass 48 is set into motion with a relatively small angular speed only. It is only during the course of the further running down movement of the parts that it is accelerated to a faster speed on account of the continuous variation in the length of the effective lever arms of the cam plates 40 and 42.

It will be understood from what has been said above that when the shutter trigger 22 is released (the shutter having been previously tensioned or cocked) so that the master member 16 can start its running down movement, the shutter blades are immediately opened and at about the time that they reach their fully open position the abutment shoulder 16b on the master member engages the abutment shoulder 32b on the transmission lever 32, and tends to swing this transmission lever in a counterclockwise direction on its pivot 32a, against the force of the spring 34. The master member cannot complete its movement to close the shutter blades until the transmission lever 32 is displaced far enough for the master member to slip past it, and the transmission lever 32 cannot reach this position (allowing the master member to slip past) until the transmission lever 32 has turned from the position shown in FIG. 1 approximately to the position shown in FIG. 4, thereby displacing the pin 30a of the initial member 30 of the retarding train. The extent to which the pin 30a must be displaced depends on the setting of the initial starting position thereof, which in turn depends upon the position of the speed setting cam 56, as already explained and as will be well understood by those skilled in the art.

The running down movement continues until the abutment surface 16b on the master member can slide by the abutment surface 32b on the transmission lever 32, as shown in FIG. 4, whereupon the master member 16 can now complete its own running down movement without causing any further movement of the retarding mechanism, so that the shutter blades can now be closed. During the latter part of the running down movement the cam surface 16c on the master member makes engagement with the inclined surface 32d of the transmission lever 32, without causing any further rotational movement of the transmission lever. Only after the lapse of a further short time interval, the cut away portion 16e of the master member 16 comes opposite the surface 32d of the transmission lever, thereby breaking the engagement between the master member and the transmission lever, whereupon the transmission lever 32 may return to its initial starting position independently of the master member 16, under the influence of its return spring 34. The remaining members of the retarding mechanism also resume their starting positions as shown in FIG. 1, under the influence of the springs 52 and 42d.

When the master member is being tensioned or cocked in a counterclockwise direction ready for the next exposure, a part of the master member at one end of the cutaway portion 16e is temporarily pressed against the inclined surface 32d of the transmission lever 32, thereby temporarily turning the transmission lever aside from its rest position (determined by the abutment 36) in a counterclockwise direction to allow the master member to slip by toward its tensioned or cocked position. As soon as the projecting part 16c of the master member passes beyond the part 32d of the transmission lever, and the circular periphery part of the master member comes opposite the part 32d, the transmission lever 32 may return to its rest position.

A modified form of construction according to the present invention is illustrated in FIGS. 5 and 6, to which reference is now made. Except for differences mentioned below, the construction may be the same as the form previously described. The corresponding parts are indicated in some cases by the same reference numerals used in connection with FIGS. 1–4, and in other cases by the same numerals with the addition of a prime.

In the first form of construction, there was a constant axial spacing between the rotary axis of the first cam plate 40 and the rotary axis of the second cam plate 42. In contrast to this, in the second form of construction the cam edges are maintained in constant contact with each other, but there is a variable axial spacing between them.

The transmission lever 32, having the same parts 32a, 32b, 32d as before, has an abutment surface 32c' which takes the place of the abutment surface 32c in the first form of construction, and which cooperates with an operating pin 30a' on the first member 30' of the retarding mechanism. This first member 30' is rotatable on the fixed pivot 50a' and has segmental gear teeth engaged with gear teeth of the pinion 38' of the retarding train, which is rigidly connected to the cam plate 40' and is rotatably mounted on the pin 38a in the shutter housing. The cam plate has a cam edge 40a'.

The setting plate 58 is rotatably mounted on a fixed pin 58a. A weak spring 60 biases this plate 58 in a clockwise direction on its pivot. Mounted on the setting plate 58 is a cam plate 42', with a cam edge 42a', and a wheel 44' of the retarding mechanism, connected to the cam plate 42' by a pin 42c'. The cam plate and the wheel are both freely rotatable on the pin 62 which is fixed to the setting plate 58. A spring 42d' tends to turn the cam plate 42' in a counterclockwise direction, thereby to keep the cam surface 42a' thereof in engagement with the cam surface 40a' of the first cam plate 40'. A spring 52', more powerful than the spring 42d', also tends constantly to turn the first gear train member 30' in a clockwise direction on its pivot 50a', which thus tends constantly to turn the pinion 38' and cam disk or plate 40' in a counterclockwise direction, to hold the cam edge 40a' on the cam plate 40' in engagement with the edge 42a' on the cam plate 42'.

An eccentric 64 having a force fit on the pin 62 has a periphery which engages against the working face 56' of the shutter time or speed setting ring. The spring 60 holds the member 64 against the speed cam 56', so that the speed cam together with the action of the spring 60 determines the position to which the setting plate 58 swings on the pivot 58a. The setting plate 58 also carries a pin 66, on which is rotatable the pinion 46' meshing with gear teeth on the periphery of the wheel 44'. The flywheel 48' of relatively large mass is also rotatable on the pivot 66 and secured to the pinion 46' to rotate therewith.

FIG. 5 illustrates the parts when set in an extreme position for maximum delay or maximum retarding effect, giving the longest or slowest exposure of which the mechanism is capable. If a faster or shorter exposure is to be set, the exposure speed setting ring (only the cam edge of which is partially shown at 56') is turned to bring another portion of the cam face 56' opposite the eccentric member 64 on the pin 62, allowing the pin 62 to move closer to the center of the shutter and thereby allowing the setting plate 58 to turn clockwise on its pivot 58a, under the influence of the spring 60. This will swing the pivot 62 farther away from the pivot 38a, thus increasing the distance between the pivotal axes of the respective cam plates 40' and 42', both of which have a like cam contour. Because of the increase in the spacing between the axes, the first cam 40' can now turn somewhat in a counterclockwise direction under the influence of the spring 52'. This will move the pin 30a' to another position closer toward the center of the shutter, such as shown in dot dash lines in FIG. 5. These movements result in a variation in the transmission ratio between the coupled members 40' and 42', to increase the transmission ratio between the two cam plates, and also result in moving the pin 30a' to a position where it is engaged by the transmission lever 32 only at a later point in the running down movement of the transmission member, so that less retarding effect is produced.

Except for differences which will be obvious from what has been said above, the operation of this second form of construction is substantially the same as that of the first form. A wide variation of retarding effect between maximum and minimum limits is possible, in a smooth manner without steps or abrupt changes, and very little power is needed to adjust the parts from one shutter speed to another, so that the shutter speed control cam operating on the eccentric contact member 54 or 64 can be powered by the relatively weak power available from an exposure meter. The contact member 54 or 64 against which the speed control cam slides can be of relatively low frictional material, such as nylon, to minimize friction at this point and permit the speed control cam to be turned with the least possible effort. For calibration purposes, the eccentric members 54 or 64 may be slightly turned on their respective pivots 50a and 62, and will remain in any adjusted position to which they are set, because of the tight frictional engagement with the pin.

The peripheral contour of each cam plate 40 and 42, or 40' and 42', preferably is in the form of a logarithmic spiral with a tangent angle of less than 75 degrees. This has the advantage that the contact point at any time can always be arranged midway between the inter-coupled axes, thereby avoiding slip. This increases the safety factor of the retarding mechanism.

It is pointed out that although the cam plates of any particular pair (such as 40 and 42, or 40' and 42') are preferably of the same form and cam shape, this is not necessarily the case. It is within the scope of the invention to use different cam forms for the two plates of a pair, if desired. Moreover, cam plates with two different cam zones may be used, in which case the shape and pitch would be suited to the prevailing operating conditions. Also, if there is a need for greater resistance in the retarding gear transmission, or if other conditions require it, a plurality of pairs of cam plates can be used successively in the retarding train, rather than only a single pair, the first pair of cam plates driving a member which, in turn, drives a second pair of cam plates.

As already mentioned, the use of cam plates which roll on one another, as part of the retarding train, has the advantage that the retarding or delaying mechanism provides for a very wide range of continuous regulation and consequently a range of regulation of the exposure time of very wide scope can be achieved with a delaying mechanism of this character. Consequently, such mechanisms can be used in cameras with automatic means for setting the exposure time, where a continuous and readily-implemented delaying mechanism regulation is desirable.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter including a retarding train of rotary members successively driving each other, characterized by the fact that two successive members of said retarding train are in the form of cam plates in driving contact with each other at their peripheries, the peripheral pitch of each of said cam plates increasing and decreasing smoothly and continuously, the rotary axes of the two cam plates being at a variable axial spacing from each other.

2. A construction as defined in claim 1, further characterized by spring means tending to turn at least one of said cam plates to keep their respective peripheries in contact with each other when said axial spacing is changed.

3. A construction as defined in claim 2, further characterized by the fact that the last member of the retarding train is in the form of a flywheel mass.

References Cited by the Examiner

UNITED STATES PATENTS

| | | | |
|---|---|---|---|
| 2,261,723 | 11/1941 | Hoffman | 58—21.13 |
| 2,565,017 | 8/1951 | Brown | 58—21.13 |
| 3,089,401 | 5/1963 | Gebele | 95—63 |
| 3,092,003 | 6/1963 | Kiper | 95—63 |

JOHN M. HORAN, *Primary Examiner.*